United States Patent [19]

Meehan

[11] 4,288,957

[45] Sep. 15, 1981

[54] FLOOR SYSTEM

[75] Inventor: M. Dennis Meehan, St. Louis County, Mo.

[73] Assignee: The Binkley Company, Warrenton, Mo.

[21] Appl. No.: 46,331

[22] Filed: Jun. 7, 1979

[51] Int. Cl.³ .................... E04B 5/00; B62D 25/20
[52] U.S. Cl. .................................... 52/460; 52/376;
    52/471; 52/795; 52/801; 105/422; 296/182
[58] Field of Search ............... 52/799, 801, 377, 376,
    52/460, 471, 264; 105/422; 296/182, 181

[56] References Cited

U.S. PATENT DOCUMENTS

| 2,256,037 | 9/1941 | Reid | 296/182 |
|---|---|---|---|
| 2,669,193 | 2/1954 | Dsborn | 105/422 |
| 3,132,605 | 5/1964 | Collins | 105/422 |
| 3,163,461 | 12/1964 | Troy | 52/376 |
| 3,200,549 | 8/1965 | Cripe | 52/376 |
| 3,319,393 | 5/1967 | Tantlinger | 296/182 |
| 3,324,616 | 6/1967 | Brown | 52/377 |
| 3,420,025 | 1/1969 | Portz | 52/377 |
| 3,705,732 | 12/1972 | Marinelli | 296/182 |

FOREIGN PATENT DOCUMENTS

| 1262231 | 4/1961 | France | 52/376 |

Primary Examiner—John E. Murtagh
Attorney, Agent, or Firm—Senniger, Powers, Leavitt and Roedel

[57] ABSTRACT

A floor system for a trailer or the like comprising a plurality of elongate sheet metal floor panels extending side-by-side lengthwise of the trailer on beams extending transversely of the trailer. Each of the metal floor panels comprises upper and lower panel members, the upper member being in the form of a shallow inverted channel, comprising a relatively wide web member, a pair of relatively narrow flanges extending down from the web member at opposite sides of the web member, and a pair of fastening lips extending laterally outwardly from the flanges at the lower edges of the flanges and bearing on the beams of the trailer. The elongate metal floor panels are mounted on the beams one alongside another with the fastening lips at adjacent sides of adjacent floor panels defining, in conjunction with the opposing flanges extending up from the fastening lips, upwardly opening generally rectangular recesses extending longitudinally of the trailer between adjacent floor panels. Wood flooring members extend longitudinally in the recesses between adjacent floor panels and bear on the lips, and fasteners extend through the wood flooring members for fastening the latter to the trailer beams.

10 Claims, 6 Drawing Figures

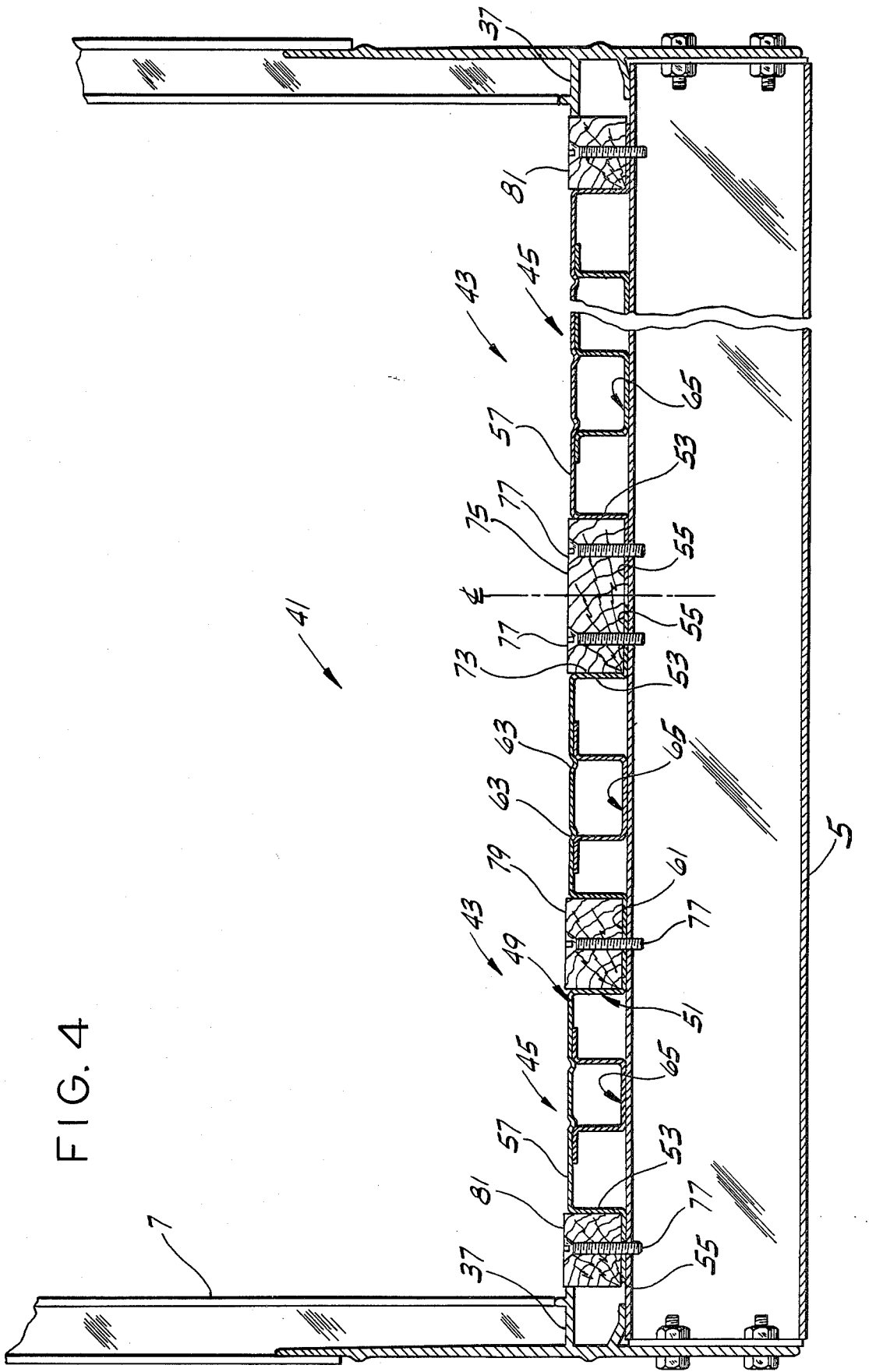

FLOOR SYSTEM

BACKGROUND OF THE INVENTION

This invention relates to floor systems and more particularly to a combination wood-sheet metal floor system especially adapted for large trailers and the like.

Due to the relatively high cost of lumber, the use of metal flooring instead of wood flooring for trailers and the like has become commercially attractive. One such type of flooring comprises a plurality of elongate sheet metal floor panels extending side-by-side lengthwise of the trailer on floor supporting beams of the trailer. Each floor panel comprises an upper panel member generally in the form of an inverted channel, having a relatively wide web and stepped flanges extending down from the web at opposite sides of the web. The flange at one side of the web is stepped outwardly, having a first vertical section extending down from the web, a first horizontal section extending laterally outwardly from the lower edge of the first vertical section, a second vertical section extending down from the outer edge of the first horizontal section, and a second horizontal section extending laterally inwardly from the lower edge of the second vertical section and bearing on the trailer beams. The flange at the other side of the web is stepped inwardly, having a first vertical section extending down from the outer edge of the web member, a first horizontal section extending laterally inwardly from the lower edge of the first vertical section, a second vertical section extending down from the inner edge of the first horizontal section and a second horizontal section extending laterally inwardly from the lower edge of the second vertical section and bearing on the trailer beams. Each of the prior art floor panels also includes a series of separate inverted channel members extending longitudinally of the floor panel on the underside of the upper panel member. These channel members each comprise a web secured in face-to-face relation to the underside of the upper panel member, flanges extending down from the web at opposite sides of the web, and lips extending laterally outwardly from the lower edges of the flanges and bearing on the trailer beams.

A series of the above-described floor panels are mounted one alongside another lengthwise of the trailer with the outwardly-stepped flange at one side of a panel underlying the inwardly-stepped flange of an adjacent panel and with the inwardly-stepped flange at the other side of the panel overlying the outwardly-stepped flange of an adjacent panel. Fasteners (e.g., screws) extending down through the interfitting portions of the flanges and into the trailer beams secure the floor panels in place.

This type of flooring has presented several problems, one being that road spray, salt and other corrosive substances tend to collect on the horizontal upper faces of the lips of the inverted channel members and on the upper faces of the lower horizontal sections of the flanges at opposite sides of the upper panel members, thus increasing the rate of corrosion of the flooring. Another problem has arisen involving the securement of this type of all-metal flooring to the trailer beams. In this connection, it will be understood that fork lift trucks are often driven on the flooring as the trailer is loaded and unloaded. In the past, as wheels of the trucks have rolled over the fasteners securing the flooring to the trailer beams, the flooring around the head of the fasteners has tended to buckle or collapse, causing the flooring to become loose.

SUMMARY OF THE INVENTION

Among the several objects of this invention may be noted the provision of an improved floor system for a trailer or the like which is of combination wood-sheet metal construction; the provision of such a floor system which has relatively high load-bearing strenth and which is durable in use; the provision of such a floor system which is adapted to remain securely fastened to the floor supporting structure of the trailer even after long and extensive use; the provision of such a floor system the underside of which is formed for shedding road spray and the like for reducing corrosion of the floor system; and the provision of such a floor system which is economical to manufacture.

Generally, a floor system of this invention for a trailer or the like comprises a plurality of elongate sheet metal floor panels extending side-by-side lengthwise of the trailer on floor supporting means of the trailer. Each of the metal floor panels comprises upper and lower panel means, the upper panel means comprising an upper panel member having a relatively wide web member above the floor supporting means, a pair of flanges extending down from the web member at opposite sides of the web member, and a pair of fastening lips extending laterally outwardly from the flanges at the lower edges of the flanges and bearing on the floor supporting means. The lower panel means comprises a series of channel sections on the underside of the web member of the upper panel member and extending longitudinally of the latter. Each channel section includes a web bearing on the floor supporting means and flanges extending up from the web at opposite sides of the web to the underside of the web member of the upper panel member. The floor panels are mounted on the floor supporting means one alongside another with the fastening lips at adjacent sides of adjacent floor panels defining, in conjunction with the opposing flanges extending up from the fastening lips, upwardly opening generally rectangular recesses extending longitudinally of the trailer between adjacent floor panels. Wood flooring members extend longitudinally in the aforesaid recesses between adjacent floor panels and bearing on the fastening lips. Fasteners extending through the wood flooring members fasten the latter to the floor supporting means.

Other objects and features will be in part apparent and in part pointed out hereinafter.

BRIEF DESCRIPTION OF THE DRAWINGS

FIG. 4 is a view similar to FIG. 1 illustrating an alternative floor system of this invention;

FIG. 5 is a partial plan of FIG. 4; and

Corresponding reference characters indicate corresponding parts throughout the several views of the drawings.

DESCRIPTION OF THE PREFERRED EMBODIMENT

Figure 1:
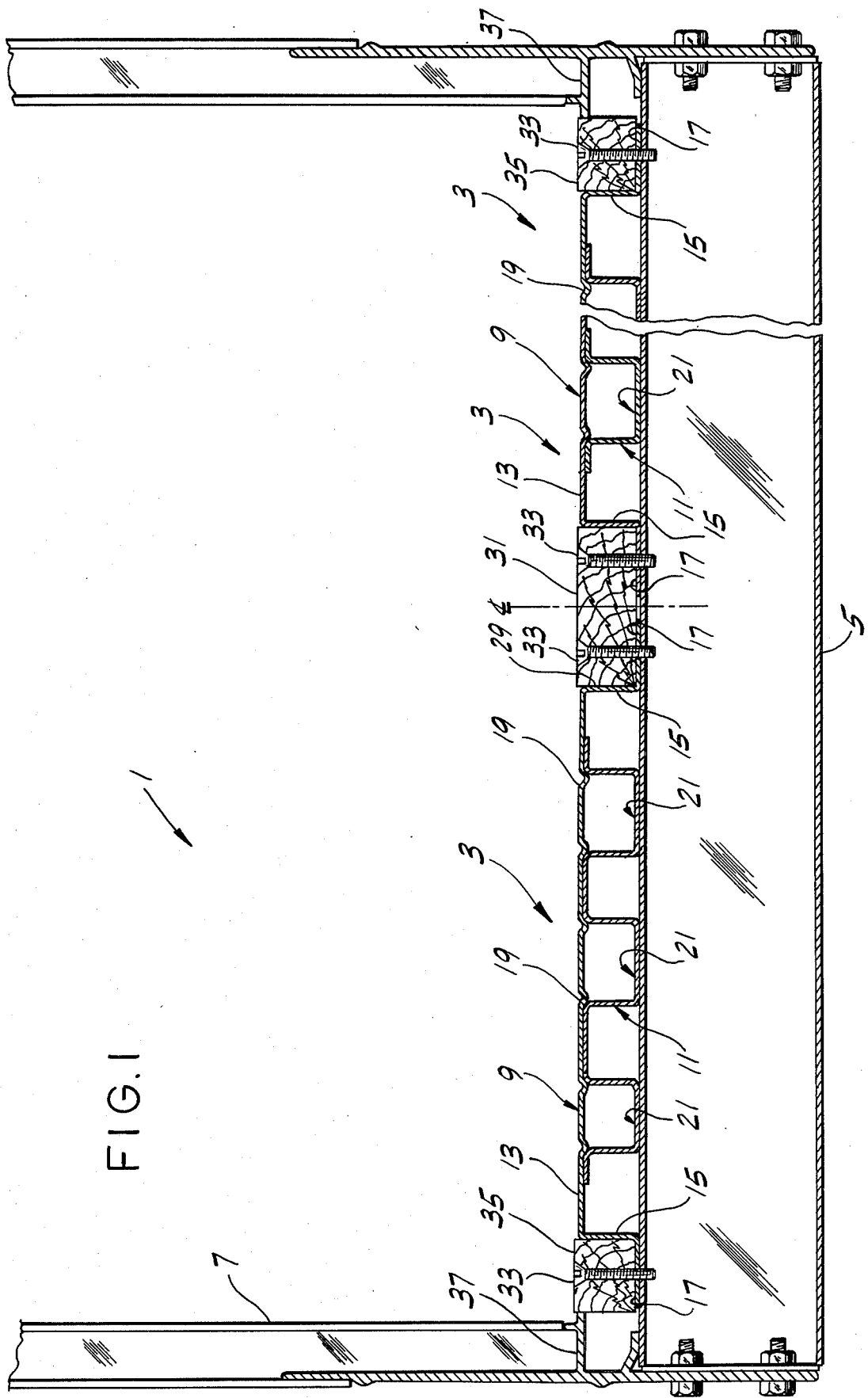
FIG. 1 is a vertical section taken through a floor system of this invention installed in a trailer.
Figure 2:
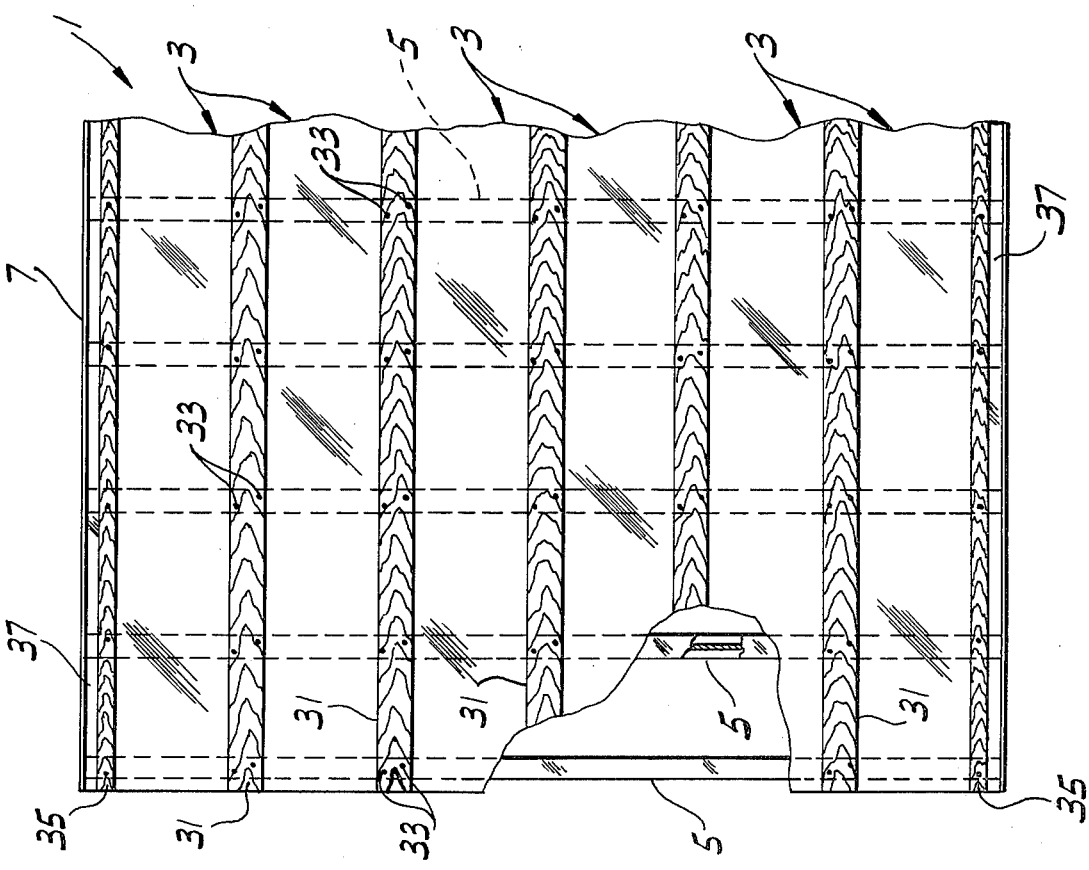
FIG. 2 is a partial plan of FIG. 1.

Referring to the drawings, there is generally indicated at 1 in FIGS. 1 and 2 a combination wood-sheet metal floor system of this invention comprised of a plurality of elongate sheet metal floor panels 3 of this invention laid side-by-side lengthwise of the trailer across substantially the entire width of the trailer on floor supporting means 5 extending transversely with respect to the floor panels. For purposes of illustration, the floor system is shown installed in a trailer 7 with the floor panels 3 extending lengthwise of the trailer on I-beams which constitute the aforesaid floor supporting means 5, but it will be understood that the floor system may be suitably used in other types of vehicles or in buildings.

Each of the floor panels 3 (they are all identical) is formed of suitable sheet metal such as 17-gauge galvanized sheet steel and comprises upper and lower panel members generally designated 9 and 11, respectively. The upper panel member 9, which is generally in the form of an inverted shallow channel (see FIG. 3), has a relatively wide (e.g., 12 inches) web member 13 spaced above the I-beams, and a pair of relatively narrow (e.g., 1⅜ inches) flanges 15 extending vertically down from the web member at opposite sides of the web member. As shown, a relatively narrow fastening lip 17 extends laterally outwardly (e.g., 1-9/16 inches) from the lower edge of each of the flanges 15 and bears on the I-beams 5. The web member 13 of the upper panel member 9 is formed to have a series of rounded shallow grooves 19 therein providing reinforcing ribs 20 extending along the web member and spaced at equal intervals thereof from one side to the other.

The lower panel member 11, which is on the underside of the upper panel 9, is an integral one-piece member formed to have a series (e.g., three) of upwardly-opening channel sections 21 extending side-by-side longitudinally of floor panel 3. More particularly, each of these three channel sections comprises a web 23 bearing on the I-beams 5 and vertical flanges 25 extending up from the web at opposite sides thereof to the underside of the web member 13 of the upper panel member 9. The flanges 25 at adjacent sides of adjacent channel sections 21 are integrally connected by a web 27 underlying web member 13 and preferably secured face-to-face thereto, as by spot welding. It will be noted that the spacing between the ribs on the bottom of the upper web member is such that a pair of adjacent ribs fit inside each channel section 21 of the lower panel member 11 so as to readily enable the lower panel member to be properly located relative to the upper panel member during assembly of the floor panel.

The floor panels 3 of the floor system 1 are mounted on the transversely extending I-beams 5 one alongside another with the fastening lips 17 at adjacent sides of adjacent floor panels spaced apart but relatively close together and defining, in conjunction with the opposing flanges 15 extending up from the fastening lips, upwardly-opening generally rectangular recesses 29 extending longitudinally of the trailer between adjacent floor panels 3. These recesses are substantially narrower than the floor panels and are spaced at substantially equal intervals transversely with respect to the trailer from one side of the trailer to the other, as shown in FIG. 2. Received in the recesses 29 and bearing on adjacent fastening lips 17 are elongate wood flooring members 31 of oak, for example. The flooring members are substantially narrower than the floor panels and the thickness (e.g., 1⅜ inches) of each is such that it projects up above the web members 13 of the floor panels. This is desirable in that it allows the wood members 31, rather than the surrounding sheet metal, to bear the weight of fork lift trucks, cargo, etc. on the flooring in the trailer.

Fasteners 33, such as flat-head self-tapping screws, extending down through each wood member 31 and into the I-beams of the trailer secure the floor panels to the trailer. As best shown in FIG. 1, these fasteners 33 extend down on opposite sides of the longitudinal center line of each recess 29 through the fastening lips 17 of adjacent floor panels and into the top flanges of the I-beams. The heads of the screws are countersunk into the wood so as to be generally flush with the surface of the wood members.

At opposite sides of the floor system adjacent the sides of the trailer are two elongate generally rectangular-section wood flooring members, which because of their location are referred to as outboard wood flooring members 35. These wood members are also substantially narrower than the sheet metal floor panels 3 and bear on the outboard fastening lips 17 of the floor panels 3 adjacent the sides of the trailer. They are secured in place abutting the flanges 15 extending up from the fastening lips by screws 33 (identical to those described above) extending down through the wood members, through the fastening lips, and thence into the I-beams. The width of the two outboard wood members 35 is such that they bear against flanges 37 extending laterally inwardly from the trailer sides. This provides further lateral support to the floor system. As in the case of the wood members 31 in the upwardly-opening recesses 29 between adjacent floor panels, the thickness (e.g., 1⅜ inches) of the two outboard wood members 35 is such that they project above the web members 13 of the metal floor panels.

Figure 6:
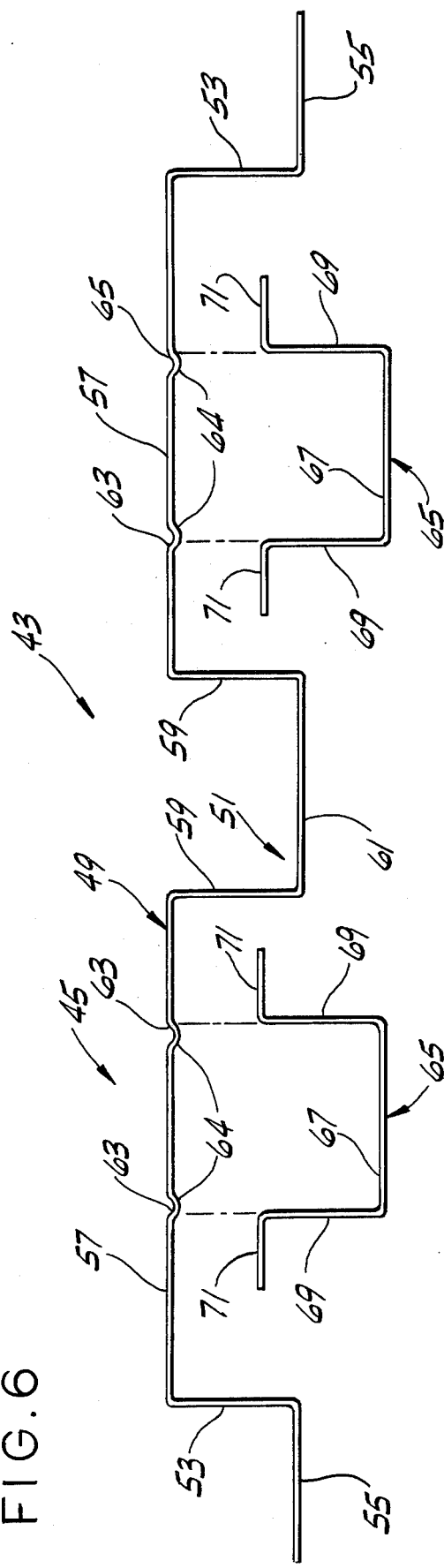
FIG. 6 is an exploded view of a metal floor panel of the alternative floor system shown in FIGS. 4 and 5.

Referring now to FIGS. 4-6 of the drawings, there is generally indicated at 41 a second combination wood-sheet metal floor system of this invention which, for purposes of illustration, again is shown installed on a trailer which is identical to the trailer described above and which is given the same reference numerals. This second or alternative floor system 41 is similar to the one described hereinabove, comprising a plurality of elongate floor panels 43 laid side-by-side lengthwise of the trailer on I-beams 5 extending transversely of the trailer.

Each of the floor panels 43 (they are all identical) is formed of suitable sheet metal, such as 16-gauge galvanized sheet steel, and comprises an upper panel member generally designated 45, the latter of which constitutes upper panel means and which has a relatively wide (e.g., 12 inches) web member 49 bent to have an upwardly opening channel 51 therein, a pair of relatively narrow (e.g., 1⅜ inches) flanges 53 extending down from the web member 49 at opposite sides thereof, and fastening lips, each designated 55, extending laterally outwardly (e.g., 1-9/16 inches) from the lower edges of the flanges 53 and bearing on the I-beams 5.

More particularly, the web member 49 of the upper panel member 45 comprises a pair of main sections, indicated at 57, extending laterally inwardly from the upper edges of flanges 53 and spaced above the floor supporting beams 5 of the trailer. The inner longitudinal edges of these main sections 57 are spaced apart with the above-mentioned channel 51 therebetween. Channel 51 comprises a pair of opposed vertical flanges 59 extending down from the inner longitudinal edges of the main sections 57 of the upper panel member 45, and a horizontal web 61 connecting the flanges 59 at the lower edges of the latter and bearing on the I-beams 5. For purposes of reinforcement, each main section 57 of the web member 49 of the upper panel member is formed to have two shallow rounded grooves 63 therein forming reinforcing ribs 64 extending longitudinally of the floor panel.

The floor panel 43 further comprises two separate channel sections or members 65 (constituting lower panel means) extending longitudinally of the floor panel on the underside of the upper panel member 45 on opposite sides of the upwardly-opening channel 51. Each of these channel sections 65 comprises a web 67 bearing on the I-beams 5, vertical flanges, each indicated at 69, extending up from the web at opposite sides of the web to the underside of the web member 49 of the upper panel member 45, and lips 71 extending laterally outwardly from the upper edges of the flanges 69 in face-to-face relation with web member 49. The lips 71 of the channel members 65 are suitably secured to the web member, as by welding. It will be observed that the spacing between the ribs 64 in the main sections 57 of the web member is such that the ribs fit inside the two channel members 65 so as to properly locate the latter relative to the upper panel member during assembly of the floor panel.

Figure 3:
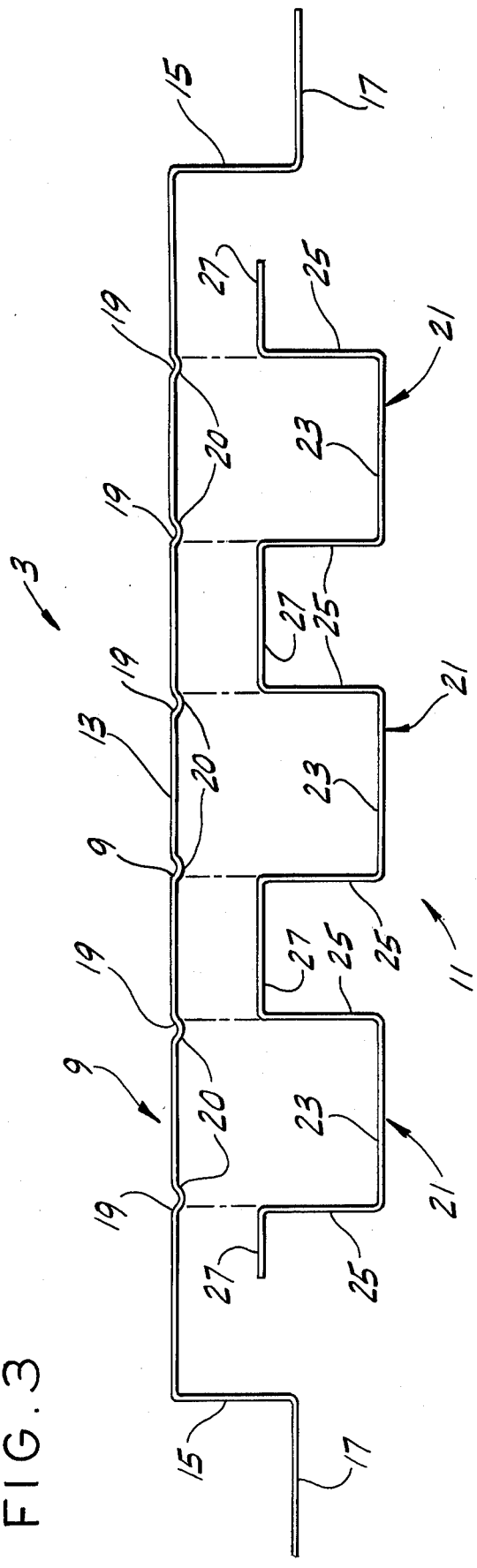
FIG. 3 is an exploded view of a metal floor panel of said flooring system.

The floor panels 43 of the floor system 41 are mounted in the trailer in the same fashion described above in regard to the floor system 1 shown in FIGS. 1-3, that is, with the fastening lips 55 at adjacent sides of adjacent floor panels relatively close together and with the fastening lips, in conjunction with the flanges 53 extending upwardly therefrom, defining upwardly-opening generally rectangular recesses 73 extending longitudinally of the trailer. Elongate wood flooring members, each designated 75, are received in these recesses and fastened to the floor support beams 5 of the trailer by flat head screws 77 in the same manner described above in regard to the floor system of the first embodiment of this invention. In addition, wood flooring members 79 are received in the upwardly opening channels 51, with their bottom faces bearing on the webs 67 of the channels. These latter flooring members 79 are secured in place by screws 77 extending down through the wood members, through the webs 61 of channels 51, and into the I-beams therebelow. As with the first floor system 1, two outboard wood members 81 extend longitudinally of the trailer at opposite sides of the floor system 41 adjacent the sides of the trailer and bear on the outboard fastening lips 55 of the floor panels 43 adjacent the sides of the trailer. The outboard wood members 81 are secured in place by fasteners 77 in the same manner described above in regard to floor system 1.

It will be observed in FIG. 4 that the thickness (e.g., 1¾ inches) of each of the wood flooring members 75, 79 and 81 of the second floor system 41 is such that the wood members project above the main sections 57 of the web members 49 of the sheet metal floor panels 43. As stated earlier in this application, this is advantageous in that the wood, which bears against portions of the sheet metal floor panel (i.e., fastening lips 55 and webs 67 of the upwardly-opening channels) which are in direct contact with the floor supporting beams 5 of the trailer, is better suited for bearing the weight of fork lift trucks, cargo and other loads on the flooring in the trailer.

A combination wood-sheet metal floor system of this invention, such as the floor systems 1, 41 described above, combines the advantages of all-wood flooring with those of all-metal flooring. Thus a combination wood-sheet metal floor system of this invention has a relatively high load-bearing capacity and durability and yet may be fabricated at relatively low cost. Moreover, the above-described floor systems of this invention are adapted to remain securely fastened to the floor supporting structure of a trailer or the like even after long and continuous use. In this regard, since the fasteners securing the floor system in place extend down through wood flooring members, rather than simply layers of sheet metal as in the case in the prior art flooring described in the background of the invention, there is no possibility of collapsing or buckling of the floor around the fasteners as fork lift trucks or the like run over the fasteners.

It will also be noted that the underside of the sheet metal floor panels 3, 43 of the present invention are formed for readily shedding road spray and the like. Thus the channel members (e.g., channel sections 21 in FIGS. 1-3 and channel members 65 in FIGS. 4-6) on the underside of the floor panels are upwardly opening rather than inverted and there are no horizontal surfaces on which road spray and the life can collect, thereby reducing corrosion of the floor system.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A floor system for a trailer or the like comprising a plurality of elongate sheet metal floor panels extending side-by-side lengthwise of the trailer across substantially the entire width of the trailer on floor supporting means of the trailer, each of said metal floor panels comprising upper and lower panel means, said upper panel means comprising an upper panel member having a relatively wide web member above said floor supporting means, a pair of flanges extending down from the web member at opposite sides of the web member, and a pair of relatively narrow fastening lips extending laterally outwardly from the flanges at the lower edges of the flanges and bearing on said floor supporting means, said lower panel means comprising a series of channel sections on the underside of the web member of the upper panel member and extending longitudinally of the latter, each channel section comprising a web bearing on said floor supporting means and flanges extending up from the web at opposite sides of the web to the underside of the web member of the upper panel member, said floor panels being mounted on said floor supporting means one alongside another from one side of the trailer to the other with the relatively narrow fastening lips at adjacent sides of adjacent floor panels being relatively closely adjacent one another for defining, in conjunction with the opposing flanges extending up from the fastening lips, upwardly opening generally rectangular recesses extending longitudinally of the trailer between adjacent floor panels, said recesses being substantially narrower than the sheet metal floor panels and spaced at substantially equal intervals transversely with respect to the trailer from one side of the trailer to the other, wood flooring members substantially narrower than said floor panels extending longitudinally in said recesses between adjacent floor panels and bearing on the lips, said flooring members projecting upwardly above the web members of said upper panel members, fasteners extending through the wood flooring members for fastening the latter to said floor supporting means, a pair of outboard wood flooring members extending longitudinally of the trailer at opposite sides of the floor system adjacent the sides of the trailer, said outboard wood flooring members being substantially narrower than the sheet metal floor panels and bearing on the fastening lips at the outboard sides of the floor panels adjacent the sides of the trailer, and fasteners extending through said outboard wood flooring members for fastening said members to the floor supporting means.

2. A floor system as set forth in claim 1 wherein fasteners extend down through each wood flooring member on opposite sides of the longitudinal center line of the upwardly opening recess in which said member is received, and thence down through the fastening lips of adjacent floor panels into said floor supporting means for fastening the floor panels to the trailer.

3. A floor system as set forth in claim 1 wherein said lower panel means of each sheet metal floor panel comprises an integrally-formed one-piece lower panel member comprising said channel sections, the flanges at adjacent sides of adjacent channel sections being connected by a web underlying the web member of said upper panel member.

4. A floor system as set forth in claim 1 wherein the web member of said upper panel member of each sheet metal floor panel has an upwardly opening channel formed therein comprising a web bearing on said floor supporting means, said channel sections of the lower panel means extending alongside said upwardly opening channel on opposite sides thereof, said floor system further comprising a wood flooring member extending longitudinally in said upwardly opening channel of said web member, and fasteners extending down through the wood flooring member and the web of said upwardly opening channel into the floor supporting means.

5. A floor system as set forth in claim 1 wherein the web member of said upper panel member comprises a pair of main sections extending laterally inwardly from the upper edges of said flanges, the inner longitudinal edges of said main sections being spaced-apart, and an upwardly opening channel section comprising a pair of opposed flanges extending down from the inner longitudinal edges of said main sections and a web connecting the flanges at the lower edges of the latter and bearing on said floor supporting means, said channel sections of the lower panel means extending alongside said upwardly opening channel on opposite sides thereof, said floor system further comprising a wood flooring member extending longitudinally in the upwardly opening channel section of said web member, and fasteners extending down through the wood flooring member and the web of the upwardly opening channel section for fastening said upper panel member and said wood flooring member to said floor supporting means.

6. A flooring system as set forth in claim 5 wherein said wood flooring member in said upwardly opening channel section projects upwardly above the main sections of said web member.

7. A combination wood-sheet metal floor system for a trailer or the like comprising a plurality of elongate sheet metal floor panels adapted to extend side-by-side lengthwise of the trailer across substantially the entire width of the trailer, each floor panel comprising upper and lower panel means adapted to be supported on floor supporting means of the trailer, said upper panel means comprising an upper panel member having a relatively wide web member above said floor supporting means, a pair of flanges extending down from the web member at opposite sides thereof, and a pair of relatively narrow fastening lips extending laterally outwardly from the flanges at the lower edges of the flanges for bearing on said floor supporting means, and said lower panel means comprising a series of channel sections on the underside of the web member of the upper panel member and extending longitudinally of the latter, each channel section comprising a web adapted to bear on said floor supporting means and flanges extending up from the web at opposite sides of the web to the underside of the web member of the upper panel member, said floor panels being adapted to be mounted on said floor supporting means one alongside another from one side of the trailer to the other with the relatively narrow fastening lips at adjacent sides of the panels being relatively closely adjacent one another for defining, in conjunction with the opposing flanges extending up from the fastening lips, upwardly opening relatively narrow recesses extending longitudinally of the trailer between adjacent panels, wood flooring members substantially narrower than said floor panels, said flooring members being adapted to bear on the fastening lips and to be fastened in said recesses to said floor supporting means thereby to secure the floor panels to said floor supporting means, said flooring members having thicknesses greater than the depths of said recesses for projecting upwardly above the web members of said upper panel members when fastened in said recesses, and a pair of outboard wood flooring members adapted to extend longitudinally of the trailer at opposite sides of the floor system adjacent the sides of the trailer, said outboard flooring members being substantially narrower than the sheet metal panels and being adapted to bear on the fastening lips at the outboard sides of the floor panels adjacent the sides of the trailer and to be fastened to said floor supporting means thereby to secure the floor panels to the floor supporting means.

8. A sheet metal floor panel as set forth in claim 7 wherein said lower panel means of said floor panel comprises an integrally-formed one-piece lower panel member comprising said channel sections, the flanges at adjacent sides of adjacent channel sections being connected by a web underlying the web member of said upper panel member.

9. A sheet metal floor panel as set forth in claim 7 wherein the web member of said upper panel member has an upwardly opening longitudinally extending channel formed therein for receiving a wood flooring member, said channel comprising a web adapted to bear on said floor supporting means, said channel sections of the lower panel means extending alongside said upwardly opening channel on opposite sides thereof.

10. A sheet metal floor panel as set forth in claim 9 wherein the web member of said upper panel member comprises a pair of main sections extending laterally inwardly from the upper edges of said flanges, the inner longitudinal edges of said main sections being spaced-apart, and a longitudinally extending upwardly opening channel section adapted to receive a wood flooring member therein comprising a pair of opposed flanges extending down from the inner longitudinal edges of said main sections and a web connecting the flanges at the lower edges of the latter and adapted to bear on said floor supporting means, said channel sections of the lower panel means extending alongside said upwardly opening channel on opposite sides thereof.

* * * * *